(12) United States Patent
Crumly

(10) Patent No.: US 6,952,913 B1
(45) Date of Patent: Oct. 11, 2005

(54) ADJUSTABLE BELT PULLEY SYSTEM

(75) Inventor: Ryan Crumly, Brock, NE (US)

(73) Assignee: Auburn Consolidated Industries, Inc., Auburn, NE (US)

( * ) Notice: Subject to any disclaimer, the term of this patent is extended or adjusted under 35 U.S.C. 154(b) by 17 days.

(21) Appl. No.: 10/845,011

(22) Filed: May 13, 2004

(51) Int. Cl.$^7$ ............................................. A01D 69/08
(52) U.S. Cl. ....................................................... 56/11.6
(58) Field of Search ................. 56/11.6, 11.3, DIG. 10, 56/DIG. 22

(56) References Cited

U.S. PATENT DOCUMENTS

| | | | |
|---|---|---|---|
| 3,412,537 A | | 11/1968 | Enters et al. |
| 3,613,462 A | * | 10/1971 | Stibbe ........................ 74/15.63 |
| 4,068,452 A | * | 1/1978 | Schaefer et al. ............. 56/11.6 |
| 4,120,136 A | * | 10/1978 | Rose ........................... 56/17.1 |
| 4,159,613 A | | 7/1979 | Knudson et al. |
| 4,231,215 A | | 11/1980 | Klas |
| 4,316,356 A | * | 2/1982 | Planeta ....................... 56/16.2 |
| 4,346,547 A | * | 8/1982 | Allison ........................ 56/13.6 |
| 4,400,930 A | * | 8/1983 | Huhman et al. ............. 56/11.6 |
| 4,498,889 A | * | 2/1985 | Stevens et al. ............. 474/133 |
| 4,511,348 A | * | 4/1985 | Witdoek et al. ............ 474/109 |
| 4,813,215 A | * | 3/1989 | Chase et al. ................. 56/11.6 |
| 4,907,401 A | | 3/1990 | Nemoto et al. |
| 4,914,898 A | | 4/1990 | Jenkins et al. |
| 5,012,632 A | * | 5/1991 | Kuhn et al. .................. 56/11.6 |
| 5,177,942 A | * | 1/1993 | Hager et al. ................. 56/11.6 |
| 5,361,566 A | | 11/1994 | Hohnl |
| 5,598,689 A | | 2/1997 | Bork |
| 5,769,747 A | * | 6/1998 | Kuhn et al. ................. 474/135 |
| 6,176,071 B1 | | 1/2001 | Thorman et al. |
| 6,398,681 B1 | * | 6/2002 | Wanie ......................... 474/101 |
| 6,578,349 B2 | | 6/2003 | Buss et al. |

* cited by examiner

Primary Examiner—Árpád Fábián Kovács
(74) Attorney, Agent, or Firm—Kinney & Lange, P.A.

(57) ABSTRACT

A riding lawn mower includes a belt-drive mechanism for transferring power from a drive pulley wheel to a deck pulley wheel to rotate cutting blades of a height-adjustable mowing deck. The drive pulley wheel connects to a drive shaft of a mower engine at a rear portion of the mower and rotatably engages a drive belt. The deck pulley wheel connects to the mowing deck at a location longitudinally spaced from the drive pulley wheel, and rotatably engages the drive belt. A guide pulley wheel, having a circumferential groove for retaining the drive belt, is located between the drive pulley wheel and the deck pulley wheel. An elongated arm pivotally connects at one end to the mower deck near the deck pulley wheel and at an opposite end pivotally engages a mounting bracket connected to the mower frame near the drive pulley wheel. The guide pulley wheel rotatably mounts to the arm near the pivotal connection of the arm to the mower deck. The arm registers angular displacement of the drive belt relative to the drive pulley wheel and adjusts the guide pulley wheel to rotate in a plane representative of the angular displacement of the drive belt.

15 Claims, 6 Drawing Sheets

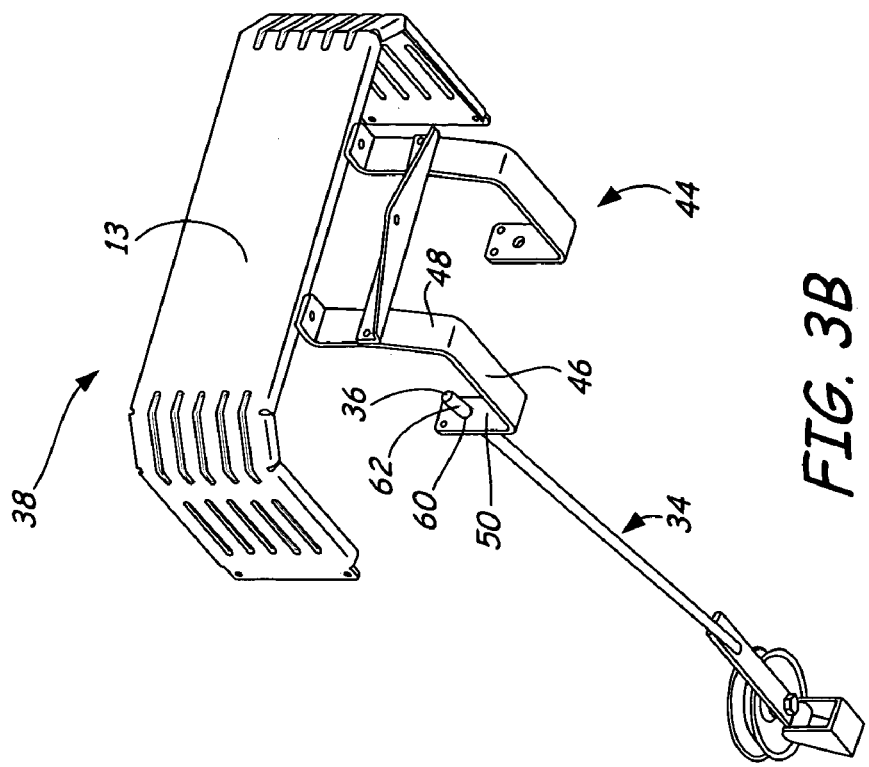
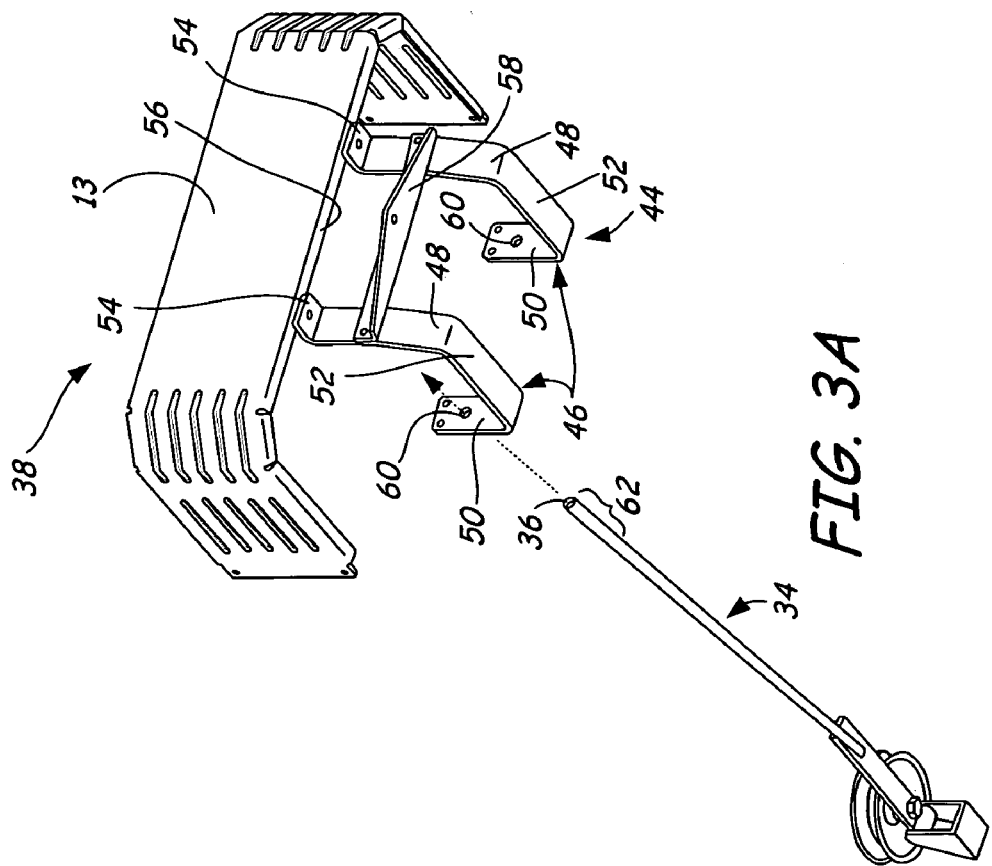
FIG. 3B
FIG. 3A

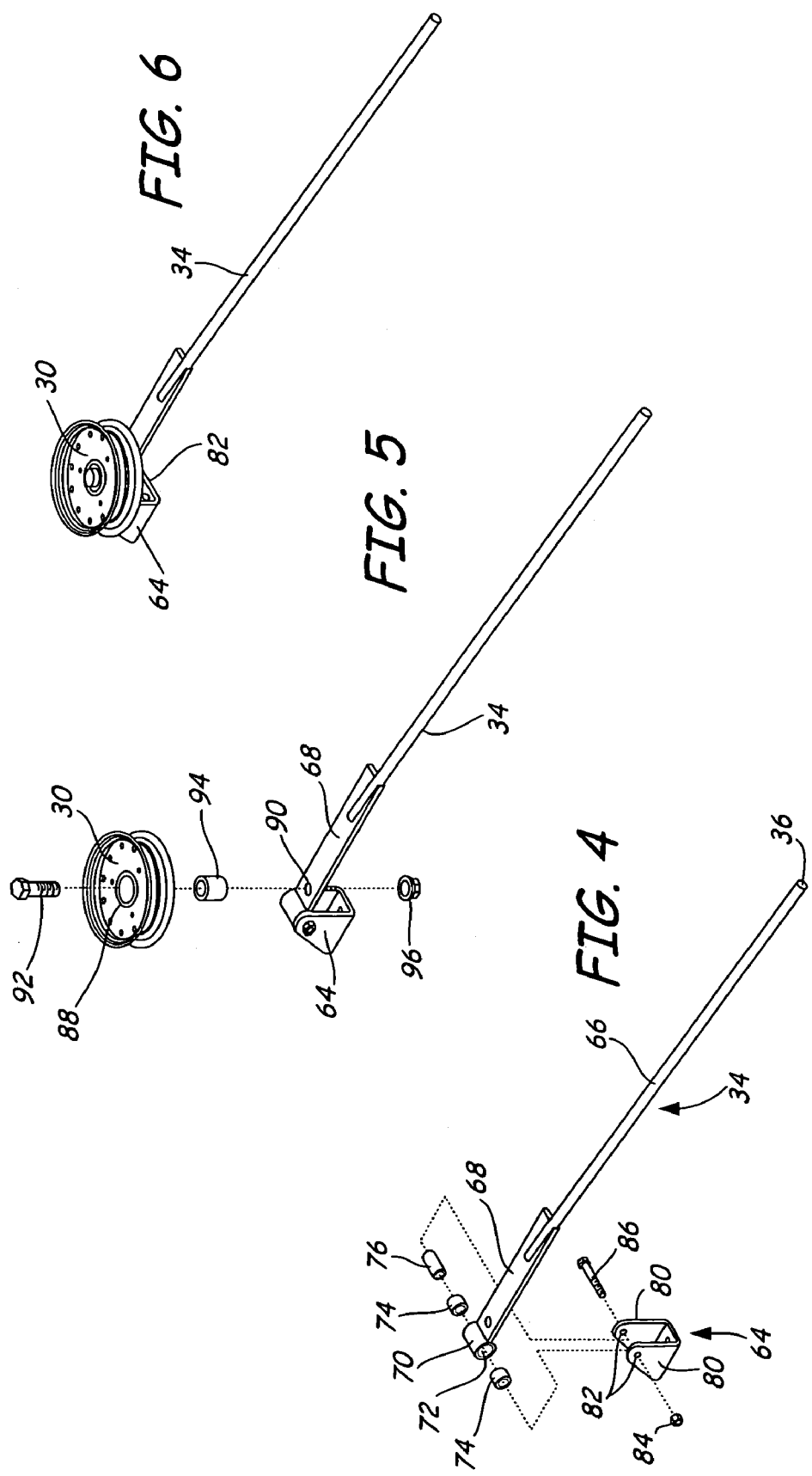

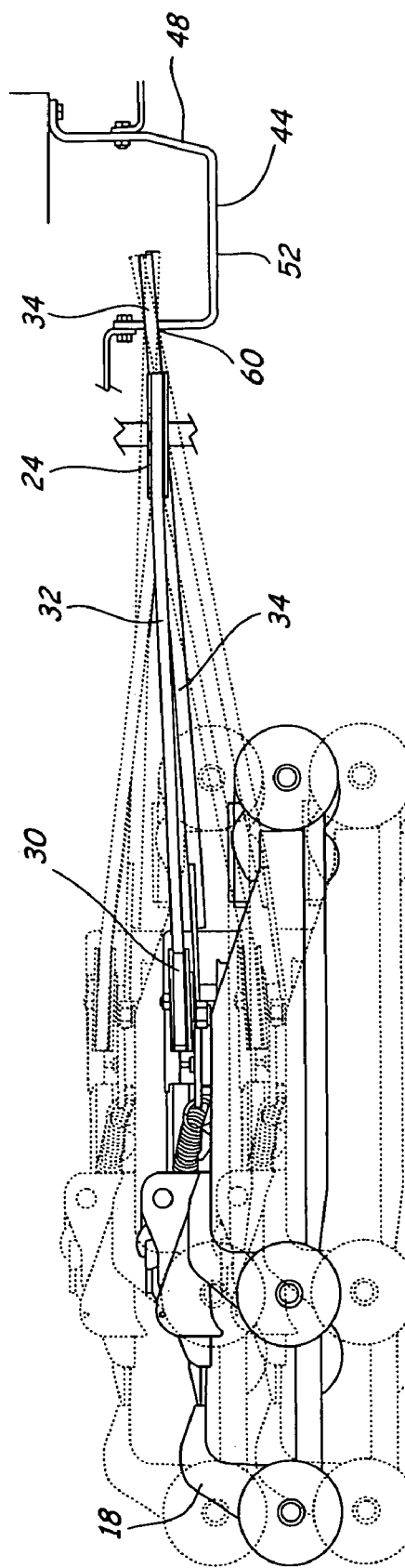

ADJUSTABLE BELT PULLEY SYSTEM

BACKGROUND OF THE INVENTION

The present invention relates generally to riding mowers having height-adjustable mower decks with motorized cutting blades. In particular, the present invention relates to a belt-drive mechanism for transferring power via a drive belt from a drive pulley wheel connected to the drive shaft of a mower engine to a deck pulley wheel associated with the mower deck.

Riding mowers with height-adjustable mower decks are capable of cutting vegetation to different heights. By adjusting the deck height, the amount of vegetation cut by the motorized cutting blades is accordingly adjusted. The cutting blades are powered by the mower engine through the use of a drive belt, which engages a drive pulley wheel and a plurality of deck pulley wheels. The drive pulley wheel is connected to the mower engine and transfers power from the engine to the drive belt. The plurality of deck pulley wheels are mounted to the deck of the mower and typically at least one of the deck pulley wheels is connected to a cutting blade via a blade shaft. In addition, typically at least one of the deck pulley wheels functions as an idler pulley wheel to provide tension to the drive belt.

This arrangement efficiently operates cutting blades when the drive pulley wheel and the deck pulley wheels rotate in a common plane. A problem may occur, however, when the height of the mower deck is adjusted because, as the mower deck is raised or lowered, the deck pulley wheels are correspondingly raised or lowered, while the position of the drive pulley wheel remains fixed. The greater the vertical displacement of the drive pulley wheel and the deck pulley wheels, the greater the angular displacement of the drive belt relative to the drive pulley wheel and the deck pulley wheels, which may increase wear on the drive belt and may throw the drive belt off the pulley wheels. To minimize these problems, most mowers having height-adjustable decks with a restricted range of mowing heights, typically between about 1.5 inches to about 4.5 inches.

An improved belt-drive mechanism for mowers with height adjustable decks is needed to reduce drive belt wear and maintain the drive belt on the pulley wheel system.

BRIEF SUMMARY OF THE INVENTION

The present invention is a belt-guide mechanism for a mower that includes a height-adjustable mowing deck, a motor, and a drive belt. The mowing deck is supported by a frame of the mower and includes a cutting blade, a blade shaft connected to the cutting blade, and a blade pulley wheel connected to the blade shaft. The motor is carried on the frame and spaced from the deck and includes a drive shaft and a drive pulley wheel connected to the drive shaft. The drive belt is operably connected to the drive pulley wheel and the blade pulley wheel.

The belt-guide mechanism of the present invention has a first mounting bracket connected to the mower generally near the drive pulley wheel. The first mounting bracket pivotally supports a first end of an arm. A guide pulley wheel is connected to a second end of the arm, and rotatably engages the drive belt generally near the blade pulley wheel.

BRIEF DESCRIPTION OF THE DRAWINGS

FIG. 3A is a partial perspective view of a belt-drive mechanism prior to pivotal engagement of an elongated arm with a mounting bracket.

FIG. 3B is a partial perspective view of the belt-drive mechanism of FIG. 3A with the elongated arm and the mounting bracket in pivotal engagement.

FIG. 4 is an exploded perspective view of a pivotal connection between the elongated arm and a U-shaped mounting bracket.

FIG. 5 is an exploded perspective view of a rotational connection between a guide pulley wheel and the elongated arm.

FIG. 6 is a perspective view of the guide pulley wheel rotatively fastened to the elongated arm.

FIG. 8 is a side view of the mower deck and drive pulley wheel, with the guide pulley wheel/arm shown at different angles representative of different height positions of the mower deck.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
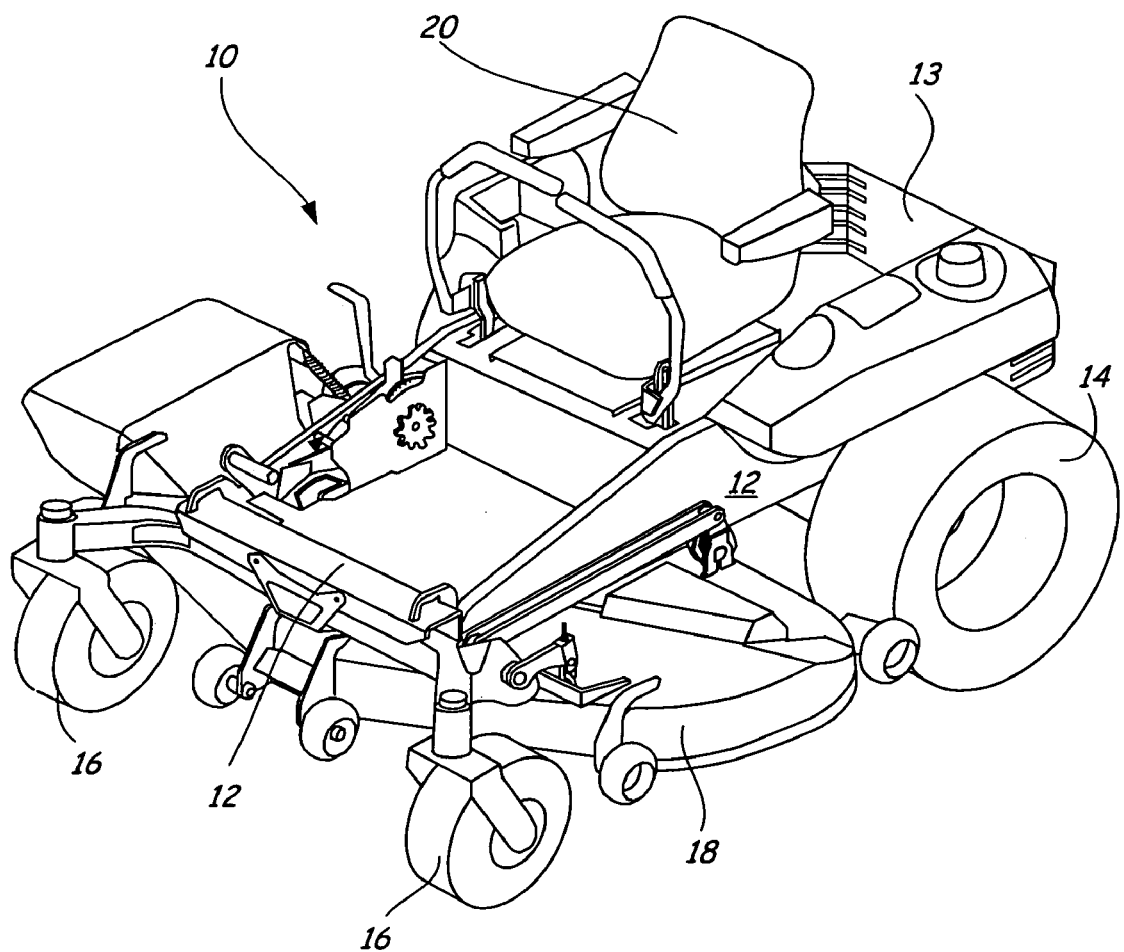
FIG. 1 is a perspective view of a riding lawn mower of the present invention.

FIG. 1 is a perspective view of a riding mower 10 employing a belt-drive mechanism of the present invention. Generally, mower 10 includes a frame 12, which includes a rear U-shaped frame member 13. Frame 12 is supported above the ground by rear wheels 14 and front wheels 16. Wheels 14 are typically driven by a gas-operated engine positioned near a rear portion of mower 10. Suspended below frame 12 between wheels 14 and 16 is a mowing deck 18, which houses one or more cutting blades. Mowing deck 18 may be raised and lowered by an operator seated in seat 20 to adjust the cutting height of deck 18. Mowing deck 18 can also be stored in a raised position. The cutting blade(s) of mowing deck 18 are driven by the gas-operated engine by means of a belt-drive mechanism beneath frame 12 and generally between frame 12 and mowing deck 18.

Figure 2:
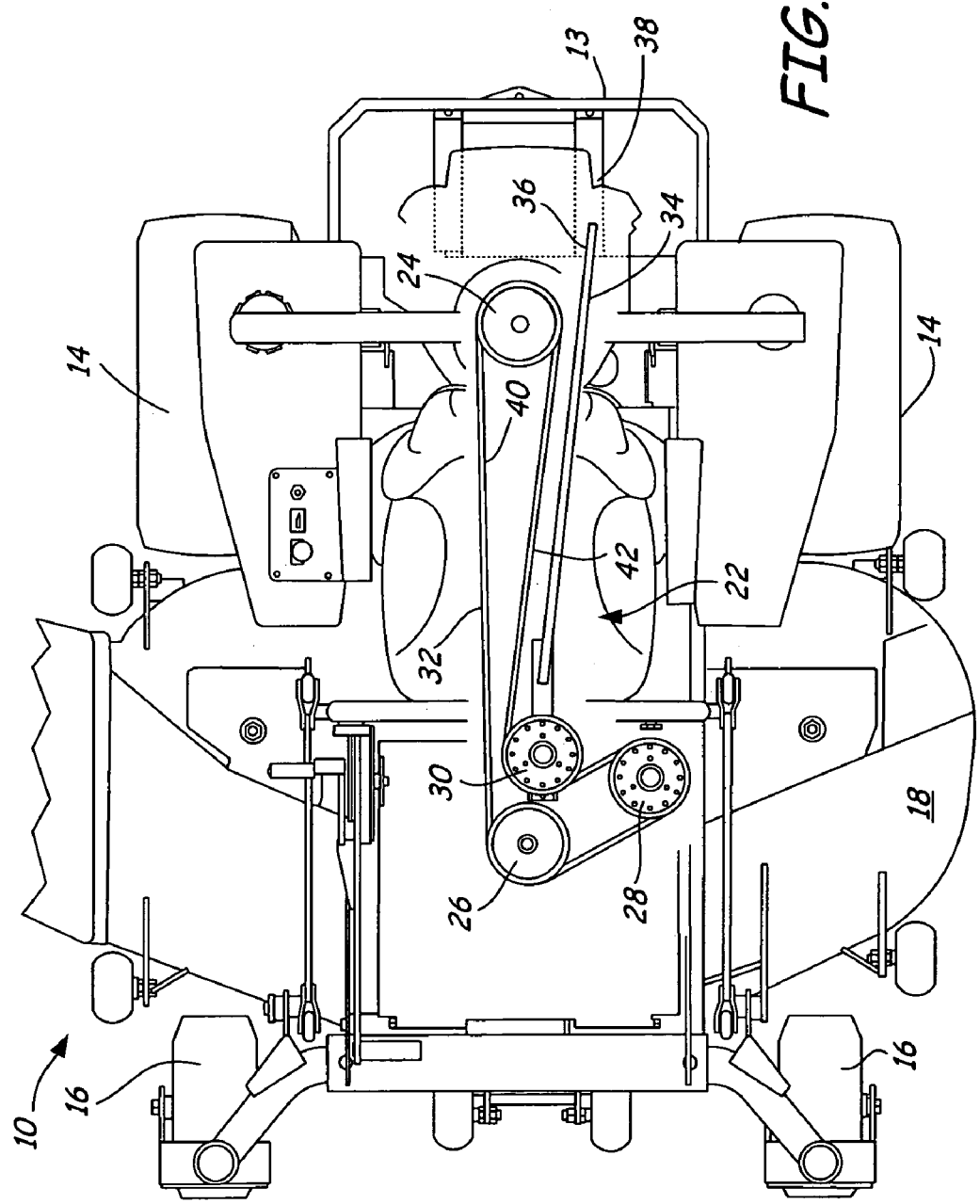
FIG. 2 is a top, partially-sectioned view of the riding lawn mower of FIG. 1.

FIG. 2 shows a top, partially-sectioned view of riding mower 10, revealing belt-drive mechanism 22 of the present invention. Belt-drive mechanism 22 is located in a longitudinal space existing generally between wheels 14 and wheels 16. In one embodiment, belt-drive mechanism 22 generally includes a drive pulley wheel 24, a deck pulley wheel 26, an optional tensioning pulley wheel 28, and a guide pulley wheel 30, all of which are conventionally configured with a circumferential groove for retaining a drive belt 32. Pulley wheels 24, 26, 28, and 30 may be, for example, either riveted split steel pulley wheels or V-pulley wheels. Pulley wheels 24, 26, 28 are all rotated in a common clockwise direction and 30 is rotated counterclockwise. In an alternate embodiment, guide pulley wheel 30 may also function as a tensioning pulley wheel, thereby alleviating the need for tensioning pulley wheel 28.

Drive pulley wheel 24 is connected in a horizontal plane via a drive shaft to a motor located at a rear of mower 10. Relative to drive pulley wheel 24, deck pulley wheel 26 is longitudinally spaced and rotationally connected to mowing deck 18 in a horizontal plane. Deck pulley wheel 26 communicates with one or more cutting blades via a shaft extending through mowing deck 18.

Tensioning pulley wheel 28 is located generally near drive pulley wheel 24, and is rotationally connected in a horizontal plane to mowing deck 18. As is conventional in the art, the spacing of tensioning pulley wheel 28 relative to deck pulley wheel 26 is adjustable to permit installation, removal and tension adjustment of belt 32 relative to belt-drive mechanism 22. Guide pulley wheel 30 is located generally near tensioning pulley wheel 28 and between deck pulley wheel 26 and drive pulley wheel 24. Guide pulley wheel 30 is carried on one end of an elongated arm 34 that is pivotally connected to mowing deck 18. Arm 34 has another end 36 that is pivotally mounted at a rear portion 38 of mower 10. As will be described later in greater detail, arm 34 registers angular change of deck 18 relative to rear portion 38 of mower 10 as the height of deck 18 is adjusted. Thus, guide pulley wheel 30 rotates in a plane defined by the angular position of deck 18 relative to rear portion 38 of mower 10.

As shown in FIG. 2, in one embodiment the circumferential grooves of drive pulley wheel 24, deck pulley wheel 26, and, when used, tensioning pulley wheel 28 engage an interior surface 40 of belt 32, while the circumferential groove of guide pulley wheel 36 engages an exterior surface 42 of belt 32. In the alternate embodiment, the location of the pivotal attachment of arm 34 to mowing deck 18 may be relocated to reposition guide pulley wheel 30 and achieve the required tensioning of belt 32.

When pulley wheels 24, 26, 28, and 30 are aligned in a common plane, the frictional contact of belt 32 on the opposing walls of the respective circumferential grooves of each pulley wheel is generally equal. A common problem of belt-drive mechanisms having pulley wheels in a fixed horizontal plane is the tendency of the belt to ride off one of the pulley wheels when the deck is raised or lowered. This problem is the result of an increased friction along one wall of the circumferential groove due to the angular change of the belt from the drive pulley wheel to the initial deck pulley wheel engaging the belt.

The mounting arrangement of guide pulley wheel 30 is a key component of the present invention. Guide pulley wheel 30 is both pivotally connected to mowing deck 18 and rotationally connected to arm 34. Guide pulley wheel 30 has an axis of rotation, the angle of which alters relative to the axis of rotation of the other pulley wheels as guide pulley wheel 30 pivots about a pivot axis defined by arm 34. The pivot axis for guide pulley wheel 30 is located generally near rear portion 38 of mower 10 at the intersection of arm 36 and a mounting bracket attached to frame member 13. Despite angular changes of deck 18 relative to drive pulley wheel 24, guide pulley wheel 30 rotates in a plane common with the angular displacement of belt 32, thereby preventing belt 32 from running out of the circumferential groove of guide pulley wheel 30.

FIGS. 3A and 3B are partial perspective views of rear portion 38 of mower 10 near frame member 13. A mounting bracket 44 is mounted on frame member 13 for pivotally receiving arm 34. FIG. 3A shows arm 34 and mounting bracket 44 prior to the pivotal engagement of arm 34 with mounting bracket 44, while FIG. 3B shows arm 34 and mounting bracket 44 in pivotal engagement with each other.

In one embodiment, mounting bracket 44 includes a pair of U-shaped members 46. Each U-shaped member 46 has a rearward facing leg 48, a forward facing leg 50, and a base 52 that interconnects legs 48 and 50. In one embodiment, U-shaped members 46 are formed by bending flat metal strips. Legs 48 are formed with a flange 54 that connects to a lower edge 56 of frame member 13. U-shaped members 46 are spaced and the respective legs 48 are connected to a brace 58. The metal wall forming forward facing leg 50 of each U-shaped member 46 is provided with an opening 60 that is sized and configured to receive an end portion 62 of arm 34.

FIG. 4 is an exploded perspective view of a pivotal connection between arm 34 and a U-shaped mounting bracket 64. Arm 34 includes elongated first metal section 66 that is welded to a flat metal section 68 opposite end 36. Flat section 68 has a cylinder 70 welded onto the end of flat section 68 opposite elongated section 66. Cylinder 70 has a cylindrical channel 72 extending through its length that is sized and configured to receive a pivot mechanism consisting of a pair of oil impregnated bronze bearing sleeves 74 and a steel tube 76. Sleeves 74 have an outer diameter slightly smaller than an inner diameter of channel 72, which allows sleeves 74 to be press fit into opposing ends of channel 72 and retained by friction inside channel 72. Tube 76 is longer than channel 72 and extends beyond sleeves 74 when positioned inside sleeves 74.

Mounting bracket 64 is a U-shaped metal bracket that secures flat section 68 of arm 34 to mowing deck 18 of mower 10. Wall members 80 of mounting bracket 64 are spaced to engage the ends of tube 76. Holes 82 in wall members 80 allow for the attachment of tube 76 with a suitable connector, such as nut 84 and bolt 86. In this configuration, cylinder 70 of arm 34 may rotate freely relative to tube 76, thereby enabling arm 34 to pivot relative to mounting bracket 64 in response to adjustments of the mowing deck height.

As shown in FIG. 5, guide pulley wheel 30 has a central opening 88 common with an axis of rotation, which allows wheel 30 to be connected to a hole 90 in flat section 68 with a bolt 92. Central opening 88 is defined by a bearing that allows guide pulley wheel 30 to rotate freely around bolt 92. A spacer 94, which has an inner diameter larger than an outer diameter of bolt 92, spaces wheel 30 and flat section 68 to allow wheel 30 to rotate without contacting flat section 68. A nut 96 secures bolt 92 and wheel 30 to flat section 68, as shown in FIG. 6.

Figure 7:
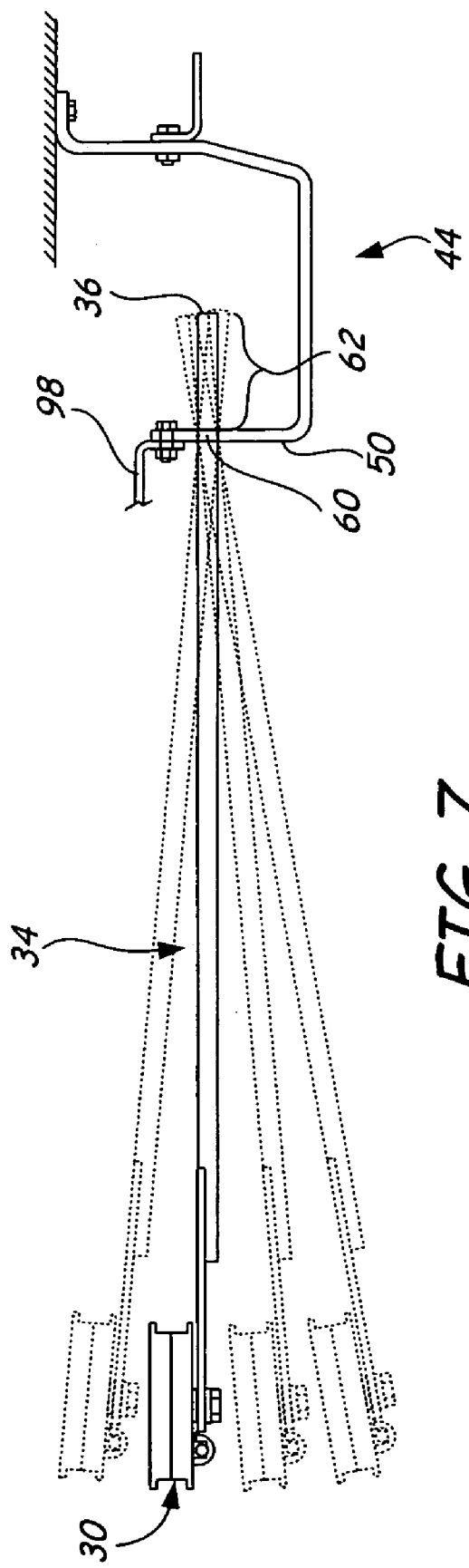
FIG. 7 is a side view of the guide pulley wheel mounted on the elongated arm and pivoting relative to the mounting bracket.

FIG. 7 is a side view of guide pulley wheel 30 mounted on arm 34 and pivoting relative to mounting bracket 44. As shown in FIG. 7, a pivot axis for guide pulley wheel 30 relative to mounting bracket 44 is located generally at the intersection of end portion 62 and opening 60 of mounting bracket 44. Opening 60 is sized so that end portion 62 has sufficient freedom of movement within opening 60 to pivot through a range of angular displacements of the mowing deck relative to mounting bracket 44. Since guide pulley wheel 30 is rotatably connected to arm 34, the axis of rotation for guide pulley wheel 30 remains perpendicular to arm 34 but changes relative to the axis of rotation of pulley wheels 24, 26, and 28 in accordance with the angular displacement of arm 34. As shown in FIG. 7, a connector 98 attaches to forward facing leg 50 of mounting bracket 44 to secure forward facing leg 50 to the mower frame.

FIG. 8 shows the effects on belt 32 of varying the height of mowing deck 18 relative to drive pulley wheel 24. Pulley wheels 26 and 28 are omitted from FIG. 8 to ease the viewing of guide pulley wheel 30. As the height of mowing deck 18 changes, the angle of belt 32 changes from drive pulley wheel 24 to guide pulley wheel 30, which is the initial pulley wheel associated with deck 18 in contact with belt 32. To deter belt 32 from running off the belt-drive mechanism 22, the axis of rotation of guide pulley wheel 30 is adjusted to ensure that guide pulley wheel 30 rotates in a plane representative of the angular displacement of belt 32 relative to drive pulley wheel 24. As such, belt 32 remains centered in the circumferential groove of guide pulley wheel 30 despite changes in the height of mower deck 18, with guide pulley wheel 30 thus guiding belt 32 through changes of the mower deck height to remain on pulley wheels 28 and 30.

The pivot axis for arm 34 relative to mounting bracket 44 (i.e., opening 60 in forward-facing leg 50) is located in generally the same horizontal plane and as close as possible to the axis of rotation of drive pulley wheel 24. This orientation closely aligns the angle of arm 34 with the angle of belt 32 so that guide pulley wheel 30 is rotated in a plane that is generally common with the angle of belt 32 relative to guide pulley wheel 30 and drive pulley wheel 24.

While FIG. 8 represents only three deck height adjustments, the present invention is useful for a number of different height settings for mower deck 18. The mower deck height may be continually variable within a range of deck heights determined by a maximum angular displacement of the mowing deck relative to the drive pulley wheel, or the mower deck height may vary according to a finite number of discrete height settings. In one embodiment, the mower deck has a range of deck heights that varies from a mowing height of about 1.0 inches to a mowing height of about 6.0 inches.

As described above, the belt-drive mechanism of the present invention provides an efficient system for transferring power via a drive belt from a drive pulley wheel connected to the drive shaft of a mower engine to a deck pulley wheel associated with a mower deck. An elongated arm pivotally connects at one end to the mower deck near the deck pulley wheel and at the opposite end pivotally engages a mounting bracket connected to the mower frame near the drive pulley wheel. A guide pulley wheel, which has a circumferential groove for retaining the drive belt, is rotatably mounted to the arm near the pivotal connection of the arm to the mower deck. As the height of the mowing deck changes relative to the drive pulley wheel, the arm registers the angular displacement of the drive belt relative to the drive pulley wheel and adjusts the guide pulley wheel to rotate in a plane representative of the angular displacement of the drive belt. The guide pulley wheel adjustment feature of the present invention reduces wear to the drive belt and aids in maintaining the drive belt on the belt-drive mechanism. Although the present invention has been described with reference to preferred embodiments, workers skilled in the art will recognize that changes may be made in form and detail without departing from the spirit and scope of the invention.

What is claimed is:

1. A belt-guide mechanism for a mower, the mower comprising a height-adjustable mowing deck supported by a frame of the mower, wherein the mowing deck comprises a cutting blade, a blade shaft connected to the cutting blade, and a blade pulley wheel connected to the blade shaft; a motor carried on the frame and spaced from the deck, the motor comprising a drive shaft and a drive pulley wheel connected to the drive shaft; and a drive belt operably connected to the drive pulley wheel and the blade pulley wheel, the belt-guide mechanism comprising:

a first mounting bracket connected to the mower frame generally near the drive pulley wheel;

an arm having a first and a second end, the first end pivotally supported by the first mounting bracket and the second end fixed relative to the mowing deck; and a guide pulley wheel connected to the second end of the arm, the guide pulley wheel rotatably engaging the drive belt generally near the blade pulley wheel.

2. The belt-guide mechanism of claim 1, wherein the second end of the arm is pivotally connected to the mowing deck.

3. The belt-guide mechanism of claim 2, wherein the belt-guide mechanism further comprises:

a second mounting bracket connected to the mowing deck, the second end of the arm being pivotally connected to the second mounting bracket.

4. The belt-guide mechanism of claim 1, wherein the first mounting bracket comprises a wall configured to define an opening, the opening sized and shaped to receive the first end of the arm.

5. A belt-drive mechanism for a mower having a motor and a height-adjustable mowing deck spaced from the motor, the belt-drive mechanism comprising:

a drive pulley wheel connected to a drive shaft of the motor, the drive pulley wheel having a first axis of rotation;

a blade pulley wheel connected to a blade shaft rotatably mounted to the deck, the blade shaft carrying a cutting blade;

an arm having a first and a second end, the first end pivotally connected to the mower frame near the drive pulley wheel and the second end fixed relative to the blade pulley wheel;

a guide pulley wheel rotatably connected to the second end of the arm and positioned relative to the blade pulley wheel; and a drive belt operably connected to the drive pulley wheel, the blade pulley wheel, and the guide pulley wheel;

wherein the guide pulley wheel has a second axis of rotation, the second axis of rotation angularly varying relative to the first axis of rotation as the mower deck height changes relative to a ground surface.

6. The belt-drive mechanism of claim 5, wherein the second end of the arm is pivotally connected to the mowing deck near the blade pulley wheel.

7. The belt-drive mechanism of claim 5, wherein the drive belt is maintained on the guide pulley wheel in a plane of rotation that is generally perpendicular to the second axis of rotation as the mower deck height changes relative to the ground surface.

8. The belt-drive mechanism of claim 5, wherein the belt-drive mechanism further comprises:

a first mounting bracket connected to the mower near the drive pulley wheel, the first mounting bracket configured to define an opening, the opening sized and shaped to receive the first end of the arm.

9. The belt-drive mechanism of claim 5, wherein the drive belt is directly connected to the drive pulley wheel, the blade pulley wheel, and the guide pulley wheel.

10. The belt-drive mechanism of claim 6, wherein the belt-drive mechanism further comprises:

a second mounting bracket connected to the mowing deck, the second end of the arm being pivotally connected to the second mounting bracket.

11. A belt-drive mechanism for a mower having a motor and a height-adjustable mowing deck spaced from the motor, the belt-drive mechanism comprising:

a drive pulley wheel connected to a drive shaft of the motor;

a blade pulley wheel connected to a blade shaft rotatably mounted to the deck, the blade shaft carrying a cutting blade;

a drive belt operably connected to the drive pulley wheel and the blade pulley wheel;

an arm having a first and a second portion, wherein the first portion of the arm is pivotally connected to the mower frame near the motor and wherein the second portion is fixed relative to the blade pulley wheel; and a guide pulley wheel rotatably connected to the second portion of the arm, the guide pulley wheel having a circumferential groove to receive the drive belt;

wherein, the drive belt travels in a plane of rotation generally common to the drive pulley wheel, the blade pulley wheel, and the guide pulley wheel when the mowing deck is in a first position and wherein the drive belt travels in a plane of rotation generally common to only the guide pulley wheel when the mowing deck is in a second position.

12. The belt-drive mechanism of claim 11 and further comprising a first mounting bracket connected to the mower near the drive pulley wheel, the first mounting bracket comprising a wall configured to define an opening, the opening sized and shaped to receive the first end of the arm.

13. The belt-drive mechanism of claim 11, wherein the second portion of the arm is pivotally connected to the mowing deck.

14. The belt-drive mechanism of claim 13 and further comprising:

a second mounting bracket connected to the mowing deck, the second portion of the arm being pivotally connected to the second mounting bracket.

15. The belt-drive mechanism of claim 11, wherein the drive belt is directly connected to the drive pulley wheel, the blade pulley wheel, and the guide pulley wheel.

* * * * *